(12) United States Patent
Aogaki et al.

(10) Patent No.: US 11,692,741 B2
(45) Date of Patent: Jul. 4, 2023

(54) HEAT GENERATION METHOD AND DEVICE USING IONIC VACANCIES GENERATED BY ELECTROCHEMICAL REACTION

(71) Applicant: NETECH, INC., Kawasaki (JP)

(72) Inventors: Ryoichi Aogaki, Tokyo (JP); Makoto Miura, Katagami (JP); Atsushi Sugiyama, Kawaguchi (JP)

(73) Assignee: NETECH, INC., Kanagawa (JP)

( * ) Notice: Subject to any disclaimer, the term of this patent is extended or adjusted under 35 U.S.C. 154(b) by 108 days.

(21) Appl. No.: 17/264,078

(22) PCT Filed: Jul. 31, 2019

(86) PCT No.: PCT/JP2019/029923
§ 371 (c)(1),
(2) Date: Jan. 28, 2021

(87) PCT Pub. No.: WO2020/027168
PCT Pub. Date: Feb. 6, 2020

(65) Prior Publication Data
US 2021/0372669 A1 Dec. 2, 2021

(30) Foreign Application Priority Data
Jul. 31, 2018 (JP) ................................. 2018-144621

(51) Int. Cl.
*F24V 30/00* (2018.01)
*C25B 9/17* (2021.01)
*C25B 9/67* (2021.01)

(52) U.S. Cl.
CPC ............... *F24V 30/00* (2018.05); *C25B 9/17* (2021.01); *C25B 9/67* (2021.01)

(58) Field of Classification Search
None
See application file for complete search history.

(56) References Cited

U.S. PATENT DOCUMENTS

| | | | | |
|---|---|---|---|---|
| 3,972,795 | A * | 8/1976 | Goens | C25B 9/73 204/284 |
| 4,336,122 | A * | 6/1982 | Spirig | C25B 11/036 205/628 |
| 5,273,635 | A | 12/1993 | Gernert et al. | |
| 5,616,219 | A | 4/1997 | Patterson | |
| 6,818,107 | B2 * | 11/2004 | Awano | B01J 19/00 204/252 |
| 7,708,896 | B2 * | 5/2010 | Ooe | D06F 35/003 204/278.5 |
| 8,034,220 | B2 * | 10/2011 | Melosi | H01M 8/186 204/269 |
| 2014/0027307 | A1 * | 1/2014 | Manikkathiagarajah | C02F 1/46109 205/758 |
| 2015/0211131 | A1 * | 7/2015 | Jacobs | C25B 1/04 204/239 |

FOREIGN PATENT DOCUMENTS

| | | |
|---|---|---|
| JP | 2010-506403 | 2/2010 |
| JP | 2010-216705 | 9/2010 |
| JP | 2017-050418 | 3/2017 |

OTHER PUBLICATIONS

Aogaki (2008) "Theory of Stable Formation of Ionic Vacancy in a Liquid Solution" Electrochemistry 76(7): 458-465.
Aogaki et al. (2009) "Origin of Nanobubble—Formation of Stable Vacancy in Electrolyte Solution" ECS Transactions 16(25): 181-189.
Aogaki et al. (2016) "Origin of Nanobubbles Electrochemically Formed in a Magnetic Field: Ionic Vacancy Production in Electrode Reaction" Scientific Reports 6: 28927 (10 pages).
Miura et al. (2014) "Microbubble Formation from Ionic Vacancies in Copper Electrodeposition under a High Magnetic Field" Electrochemistry 82(8): 654-657.
Miura et al. (2017) "Magneto-Dendrite Effect: Copper Electrodeposition under High Magnetic Field" Scientific Reports 7: 45511 (8 pages).
Oshikiri et al. (2013) "Buoyancy Effect of Ionic Vacancy on the Change of the Partial Molar Volume in Ferricyanide-Ferrocyanide Redox Reaction under a Vertical Gravity Field" International Journal of electrochemistry, vol. 2013, Article ID 610310 (12 pages).

(Continued)

*Primary Examiner* — Harry D Wilkins, III
(74) *Attorney, Agent, or Firm* — Edward J. Baba; Bozicevic, Field & Francis LLP

(57) ABSTRACT

The present invention provides: a heat generation method that makes the first use of the ionic vacancies that are a by-product of an electrochemical reaction and have conventionally been left unreacted; and a device for implementing the same. The present invention pertains to: a heat generation method characterized by comprising colliding, in an electrochemical reaction that proceeds in an electrolysis cell, ionic vacancies having a positive charge generated at an anode and ionic vacancies having a negative charge generated at a cathode; and a heat generation device characterized by being equipped with an electrolysis cell provided with an anode and a cathode and an electrolyte solution accommodated within the electrolysis cell, and by generating heat by colliding ionic vacancies of opposite signs generated by causing the electrochemical reaction to proceed in the electrolysis cell via the anode and the cathode.

6 Claims, 12 Drawing Sheets

(56) References Cited

OTHER PUBLICATIONS

Oshikiri et al. (2015) "Microbubble Formation from Ionic Vacancies in Copper Anodic Dissolution under a High Magnetic Field" Electrochemistry 83(7): 549-553.

Sugiyama et al. (2016) "Lifetime of Ionic Vacancy Created in Redox Electrode Reaction Measured by Cyclotron MHD Electrode" Scientific Reports 6:19795 (11 pages).

* cited by examiner (A)

(B)

HEAT GENERATION METHOD AND DEVICE USING IONIC VACANCIES GENERATED BY ELECTROCHEMICAL REACTION

TECHNICAL FIELD

The present invention relates to a device (equipment) of heat generation (heat production) utilizing the reaction heat of ionic vacancies created in electrochemical reactions. In more detail, the present invention especially relates to a method and a device enhancing the efficiency of heat production by increasing the mixing effect of a solution containing ionic vacancies created at a cathode and an anode. The method and device of this invention have made further possible highly efficient recovery etc. of the reaction heat generated and accumulated during recirculation of solution.

BACKGROUND ART

As electricity bill increases, to improve the efficiency of energy utilization, we have been confronting an important problem, i.e. the effective utilization of the wasted heats in electrolysis industry such as copper refinement and water electrolysis, and the development of redox battery for load leveling. These wasted heats involve the electricity consumption arising from the electrolytic current flowing in the reactions at the cathode and anode, or Joule's heat from the electricity consumption when charging and discharging and the reaction heats in electrochemical reactions (i.e., electrolysis and battery reaction). Especially, in electrolysis industry, the recovered wasted heats are utilized for heating of raw materials and heat-retention of electrolysis cells, contributing to reduction of manufacturing cost (e.g., non-patent document 1).

On the other hand, it is well known that voids with positive and negative charges (ionic vacancies) exist in solid crystals. Ionic vacancy generally implies a defect structure occurring in solid crystals, of which actual situation is interpreted as an atomic-scale void with electric charges resulting from the disorder of the arrangement of a crystal. It has never been thought that ionic vacancies exist in liquid solutions. However, in recent years, in magnetoelectrochemistry, where electrochemical reactions proceed under magnetic fields, not always experimentally it has been ascertained that microbubbles originated by ionic vacancies occur (non-patent documents 2-4), but also theoretically it has been clarified that to conserve the linear momentum and electric charge during an electron transfer in an electrochemical reaction, ionic vacancies are created in liquid solutions (non-patent document 5).

As schematically shown in FIG. 1, the structure of ionic vacancy 1 in liquid solution is composed of a free space part 2 (free space core) with a diameter of order of 0.1 nm surrounded by outer shell 3 of solvent molecules which are polarized by different sign depending on a cathodic or anodic reaction (in FIG. 1, due to cathodic reaction, minus signs are taken). Furthermore, the outer shell is thought to be covered with an ionic cloud 4 with opposite charges. The lifetime was experimentally determined about 1 second (non-patent document 2).

The chemical and physical natures of ionic vacancy are similar to those of hydrogen ion: Instead of hydrogen molecules arising from hydrogen ions, nanobubbles from ionic vacancies can promote dendritic growth of deposit metal (Magnetodendrite effect) (non-patent document 6). Although ionic vacancies with the same sign electrically repel each other, they can collide to be united, yielding nanobubbles (non-patent document 7). Moreover, other phenomena have been also known, e.g., from further unions by the collisions of nanobubbles, microbubbles are formed, which can be observed with an optical microscope, etc.

As mentioned above, though the interesting natures and behaviors of ionic vacancies are being clarified, there is no example applying them to industrial fields. For example, since the usual devices of heat recovery mentioned above have no mechanism to utilize ionic vacancies, the collectable heat energies were limited to Joule's heat and the reaction heats of electrochemical reactions (e.g., patent documents 1 and 2).

CITATION LIST

Patent Documents

Patent document 1: Japanese Unexamined Patent Application Publication No. 2020-216705.
Patent document 2: Japanese Unexamined Patent Application Publication No. 2017-050418.

Non-Patent Documents

Non-patent document 1: H. Ikeuchi, et al, Light Metal, vol. 30, No. 2, p. 111 (1980).
Non-patent document 2: A. Sugiyama, et al, Sci. Rep., 6, 19795 (2016).
Non-patent document 3: M. Miura, et al. Electrochemistry, 82, 654 (2014).
Non-patent document 4: Y. Oshikiri, et al, Electrochemistry, 83, 549 (2015).
Non-patent document 5: R. Aogaki, et al. Sci. Rep., 6, 28927 (2016).
Non-patent document 6: M. Miura, et al, Sci. Rep., 7, 45511 (2017).
Non-patent document 7: R. Aogaki, et al, ECS Transaction, 16, 181 (2009).

SUMMARY OF THE INVENTION

Problems to be Solved by the Invention

By examining the behaviors of ionic vacancy in liquid solutions more in detail, the present invention first provides the industrial utilization of ionic vacancy.

Means for Solving the Problems

Devoting themselves to study the behaviors of ionic vacancies in liquid solutions, the present inventors have first found the phenomenon of heat production (heat generation) by the collision between ionic vacancies with opposite charges, and then completed the present invention.

Namely, this invention provides a method of heat production comprising: making collisions between an ionic vacancy with positive charge created at an anode and an ionic vacancy with negative charge created at a cathode in an electrochemical reaction which proceeds within an electrolysis cell, and a device of heat production to perform the method.

Advantageous Effects of the Invention

By means of the heat production method and device of this invention, the energy holders inherent in electrolytic solutions, i.e., ionic vacancies, which are in vain abandoned in usual recovery of heat, can be utilized as a heat source based on the new principle.

In the present invention, only by colliding with each other of ionic vacancy with different sign produced in every electrochemical reaction, heat production is effectively obtained. Since every electrochemical reaction can be used without any restrictions, and it is practicable by simple and easy ways such as streaming electrolytic solution, this invention can be applied to all kinds of industries using electrochemical reactions.

MODES FOR CARRYING OUT THE INVENTION

In the following, the present invention is explained in detail.

Figure 1:
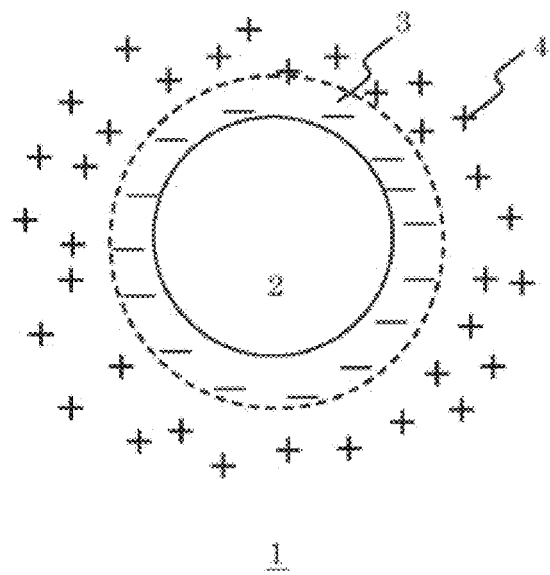
FIG. 1 A schematic of an ionic vacancy with negative charges in a liquid solution.

FIG. 1 shows the schematic expressing an ionic vacancy with negative charges created near the cathode and a positive ionic cloude surrounding it (from now on called 'minus ionic vacancy'). Near the anode, ionic vacancy with opposite (positive) charges (from now on called 'plus ionic vacancy') is created. A plus ionic vacancy is thought to take a structure reversing the charges shown in FIG. 1.

The inventors have experimentally validated the heat production in accordance with the following mechanism; when a pair of nimus and plus ionic vacancies collide with each other, the electric charges of both ionic vacancies are neutralized, leading to annihilation. At the same time, their dynamic energies for vacancy formation are emitted as heat to solution phase, producing heat.

The heat production method of this invention is the method utilizing the mechanism mentioned above, i.e. the heat production method utilizing the heat produced by the collision between plus and minus ionic vacancies in a liquid solution (electrolytic solution).

Although accompanied with electrochemical reactions such as electrolysis, ionic vacancies are created near the electrodes, no one have known the existance in liquid solutions, resultantly considering the utilization before. In addition, since in the large-sized electrolysis cells using metallic refinement and water electrolysis, the cathode and anode are installed far away, in view of a ca. 1 second lifetime of ionic vacancy, the possibility of the collision between minus and plus ionic vacancies is almost zero. As a result, in the ordinary systems of electrolysis devices, the heat originated by ionic vacancies has not been accidentally utilized.

The heat production method of this invention contains the collisions between ionic vacancies with positive electric charges created at anode (plus ionic vacancies) and ionic vacancies with negative electric charges created at cathode (minus ionic vacancies).

In this specifications, the word 'collide' implies to make an approach between ionic vacancies as near as they can interact with each other. Since plus and minus ionic vacancies have opposite electric charges, approaching each other as near as electrostatic attractive force works, they collide to make annihilation accompanied by heat production.

For example, in copper redox reaction, ionic vacancies with plus and minus two-unit charges are created in accordance with the following equations.

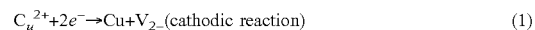

$$C_u^{2+} + 2e^- \rightarrow Cu + V_{2-} \text{(cathodic reaction)} \tag{1}$$

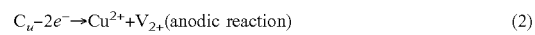

$$C_u - 2e^- \rightarrow Cu^{2+} + V_{2+} \text{(anodic reaction)} \tag{2}$$

($V_{2-}$ and $V_{2+}$ denote ionic vacancies with minus and plus two-unit charges.) On the other hand, ionic vacancies with a plus and minus single-unit charge created in the redox reaction of ferricyanide/ferrocyanide ions are created in the following equations.

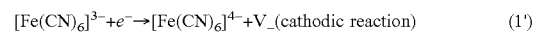

$$[Fe(CN)_6]^{3-} + e^- \rightarrow [Fe(CN)_6]^{4-} + V_- \text{(cathodic reaction)} \tag{1'}$$

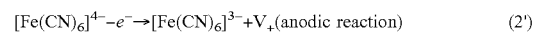

$$[Fe(CN)_6]^{4-} - e^- \rightarrow [Fe(CN)_6]^{3-} + V_+ \text{(anodic reaction)} \tag{2'}$$

($V_-$ and $V_+$ denote ionic vacancies with minus and plus single-unit charge.)

Then, plus and minus ionic vacancies with n-unit charges collide with each other yielding excess heat after a pair annihilation (the following equation (3)).

$$V_{n+} + V_{n-} \rightarrow \text{Null} + \gamma_{col} Q_{ann} \quad (3)$$

($V_{n-}$ and $V_{n+}$ are ionic vacancies with minus and plus n-unit charges, $\gamma_{col}$ is the collision efficiency and $Q_{ann}$ is the molar excess heat, of which value is equal to the solvation energy.)

As a result, when the method of this invention is performed, the following two points are important for increasing the obtained heat amount: to improve the collision efficiency of ionic vacancies and/or to increase the numbers of ionic vacancies created in electrode reactions. Moreover, the heat production also increases with solvation energy taken by ionic vacancy. The possible ways to increase the solvation energy are as follows; (1) electrolyte complex salt containing ions as much as possible is used as a supporting electrolyte, (2) the concentration of supporting electrolyte is heightened, etc., or the following way is also possible; to improve the efficiency of heat exchanger through increasing boiling point of solvent by heightening pressure.

To improve the collision efficiency, the following ways are cited; (i) to mix minus ionic vacancies near cathode with plus ionic vacancies near anode by streaming a solution (electrolytic solution), or (ii) to decrease the distance (interval) between anode and cathode, and so forth.

In the method for mixing (i) mentioned above, as for the driving force to stream electrolytic solution, for example, we can cite Lorentz force or mechanical (dynamic) pressure, etc. However, the driving force cannot be limited by them.

In the case where Lorentz force is used for the driving force, for example, we can use the magnetohydrodynamic (MHD) electrode (see R. Aogaki, et al, DENKI KAGAKU, 44 (2) 89 (1976)). When adopting mechanical (dynamic) pressure as a driving force, for example, we can force to stream an electrolytic solution by a pump and so forth connected to the electrolytic cell.

Furthermore, it is desirable that the stream of an electrolytic solution by the driving forces mentioned above contains a turbulent flow, where the turbulent flow is a flow, of which components randomly change with space and time, containing vortices with various orders of magnitude.

In the heat production method of this invention, under various ideas, we can make turbulence of an electrolytic solution. For example, after streaming an electrolytic solution in a direction given by the driving force mentioned above, by applying various devices to the flow channels of an electrolytic solution (the shape of electrolysis cell, etc.), we can make a turbulent flow in the electrolytic solution. We can exemplify some of them as follows; to make turbulence by colliding of an electrolytic solution against the wall surface of a bending and twisting channel, to make turbulence at narrowed or expanded portion of a flow channel with changing cross section (i.e., changing the diameter of the channel), and to make turbulence by installing mesh-type materials in the channel of electrolytic solution, and so forth.

The method mentioned above, i.e., (ii) to decrease the distance (interval) between an anode and a cathode can be performed by simply narrowing the distance between electrodes. Due to the narrowed electrode distance, ionic vacancies with opposite charges created at the anode and cathode collide with each other by their own molecular motions, so that such a forced flow of an electrolytic solution as mentioned in (i) is not always necessary. This is because ionic vacancies with opposite charges exist near an anode and a cathode. However, it is permitted to perform at the same time (ii) decrease of the distance between electrodes, and (i) forced flow of an electrolytic solution.

In (ii), the distance between electrodes is not especially specified as long as ionic vacancies with opposite signs collide with each other by their molecular motions. However, it is desirable to be less than 10 mm, more desirable to be less than 1 mm, and further more desirable to be less than 0.1 mm. For example, we can set up the electrode distance between an anode and a cathode, e.g., less than 100 μm, less than 80 μm, less than 60 μm, less than 50 μm, and less than 40 μm, or less than these values. Although the lower limit of the electrode distance is not especially limited as long as at the distance, electrode reactions properly proceed, it is normally more than 5 μm or more than 10 nm.

In the situation where the collision frequency of ionic vacancy increases by (ii) the narrowness of electrode distance, since the flow of an electrolytic solution is not necessary, we can use a paste-type or solid-type electrolytic solution, so that we can substantially make a whole electrolysis system solidified.

The electrolysis cell having a micrometer order of distance, for example, can be produced by means of the microfabrication technique using photo-lithography.

As for the method to increase the number of ionic vacancies, we can cite the following examples: (I) to increase the amount of ionic vacancies created at an electrode by enlarging electrode area, (II) to increase the amount of ionic vacancies by increasing ionic concentrations concerning electrochemical reactions in a solution, and (III) to increase the volume of the collision field of minus and plus ionic vacancies created, etc.

(I) and (II) mentioned above are the methods to increase the absolute amounts of ionic vacancies created, so that they can be combined with either or both of (i) the forced flow of an electrolytic solution, and (ii) the narrowness of the electrode distance mentioned above. As mentioned above, (III) is the way preparing the place accommodating the ionic vacancies quickly sent after creation, and promoting the collisions of the ionic vacancies by enlarging the volume of the place, so that it is desirable to be combined with (i) the forced flow of an electrolytic solution mentioned above.

Namely, the heat production method of this invention indispensably contains the collisions between the ionic vacancies with negative charges created at cathodes and ionic vacancies with positive charges created at anodes in electrochemical reactions proceeding within electrolysis cells, so that it is desirable to further contain the processes mentioned above for enhancing the collision frequency of ionic vacancies ((i) or (ii) mentioned above, etc.). In accordance with the contents, the process to enhance the collision frequency is carried out before starting electrochemical reactions (design and production of electrolysis cells), or carried out during electrochemical reactions (application of the external forces to electrolytic solutions), or carried out at the same time.

This invention also provides the devices of heat production to perform the heat production methods.

The devices of heat production of this invention are provided by electrolysis cells equipped with anodes and cathods and electrolytic solutions accommodated in the cells concerned. The anodes and cathodes mentioned above are connected with external power sources, which supply the electrodes (anodes and cathodes) with electricity to proceed electrochemical reactions within the electrolysis cells. The devices of heat production of the present invention furthermore provide the means to enhance the collision frequency of ionic vacancies created at anodes and cathodes.

As the means to enhance the collision frequency of ionic vacancies, when forcibly streaming electrolytic solutions, it is desirable that the devices of heat production of this invention are moreover provided with the driving means of electrolytic solutions which prepare the driving force to move electrolytic solutions and the mixing means of electrolytic solutions which prepares the mixing spaces of minus and plus ionic vacancies. As driving means of electrolytic solutions, we can exemplify magnetohydrodynamic (MHD) electrodes and pumps to circulate electrolytic solutions by mechanical (dynamic) pressures and so forth. It is preferable for the driving means of electrolytic solutions to contain the means to make turbulence in the flows of the electrolytic solutions. As the means to make turbulence, we can exemplify bending flow channels, channels with decreasing and/or increasing diameters, materials installed within channels to disturbed the flows of electrolytic solutions (diffusers of mesh-type materials etc.).

It is more preferable that the devices of heat production of this invention are furthermore equipped with some heat recovery means of the heat arising from the collisions of ionic vacancies within electrolysis cells (heat-exchange unit, etc.).

We shall explain the devices of heat production of the present invention concerning some concrete examples. However, the present invention is not limited by these concrete examples. As long as the technical philosophy of this invention is embodied to utilize the heat production by the collision between minus ionic vacancies and plus ionic vacancies, the devices optionally modifying and changing the concrete examples stated in the following are also involved in this invention.

Figure 2:
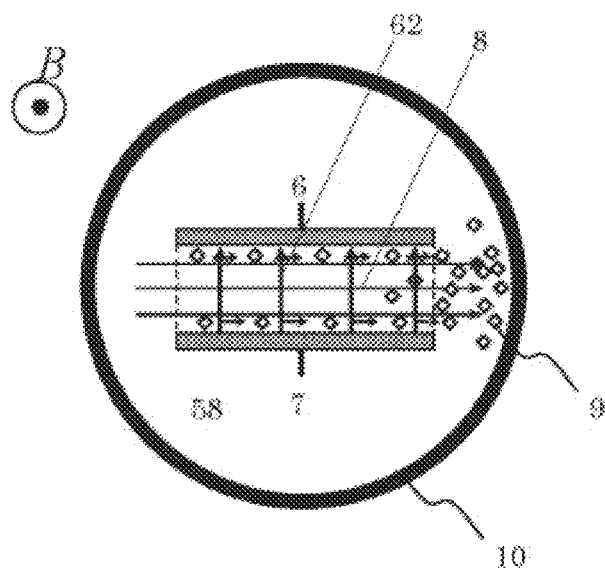
FIG. 2 A schematic exhibiting the structure of an example (driving an electrolytic solution by a Lorentz force) for the device of heat production (device of reaction heat generation) by this invention.

FIG. 2 shows an example of the device of heat production utilizing an electromagnetic force (Lorentz force) as the means of driving an electrolytic solution. This device of heat production 5 contains electrolytic solution 58 in electrolysis cell 10 with cathode 6 and anode 7, proceeding electrochemical reactions by applying voltage from a power source (not illustrated) to cathode 6 and anode 7. The device in FIG. 2 is also installed by an device generating a magnetic field in the direction from the back side to the front side of FIG. 2. By imposing the magnetic field to electrolysis cell 10, in the direction of arrow 8 (from the left to the right in FIG. 2), a Lorentz force occurs, so that the electrolytic solution moves (flows). Accompanied with the flow of the electrolytic solution, ionic vacancies 9 also transfer. In the turbulence occurring near the inner wall of electrolysis cell 10 (the curved portion of the flow channel: the means enhancing the collision frequency), minus ionic vacancies and plus ionic vacancies collide and react in high frequency, producing heat.

Figure 3:
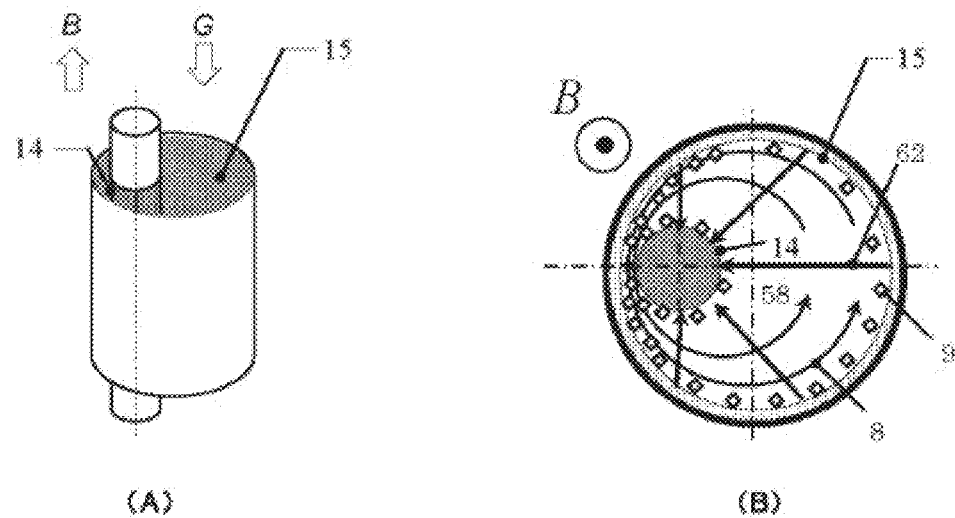
FIG. 3 The schematics of other examples of the device by this invention, where an electrolytic solution is driven by a Lorentz force.

FIG. 3 represents a modified example of the device of heat production utilizing an electromagnetic force (Lorentz force). In this example, as an electrode working under an external magnetic field B, an electrode called the deviation-type of cyclotron MHD electrode (see M. Miura, et al Sci. Rep., 7, 45511 (2017)) is used, where the configuration of electrodes is changed. As shown in FIG. 3(A), the MHD electrode is composed of two cylinder-type electrodes (14 and 15) with different diameters; inner electrode 14 is inserted in the inside of outer electrode 15. The outer wall of outer electrode 15 is insulated, whereas the inner wall works as an electrode surface for one part (anodic or cathodic) of an electrochemical reaction. On the other hand, the outer surface of inner electrode 14 works as an electrode surface for another part (cathodic or anodic) of the electrochemical reaction. In the deviation-type cyclotron MHD electrode shown in FIG. 3, the central axis of inner electrode 14 is placed deviated from the central axis of outer electrode 15 (On the contrary, in the ordinary cyclotron electrode, the central axes are set in the same place). The gap between both electrodes is filled with electrolytic solution 58.

As shown in the cross section in FIG. 3 (B), under an external magnetic field B (oriented from the back side to front side of this paper), by an electrolysis current flowing between electrodes 14 and 15, an electrolytic solution flows by the Lorentz force around inner electrode 14, circulating in anticlockwise direction 8. After the electrolytic solution passes through the narrow part between both electrodes 14 and 15 (the left side of electrode 14 in FIG. 3 (B): the means to enhance collision frequency), a turbulent flow occurs, yielding the reaction heat of ionic vacancies. This is because ionic vacancies are densely mixed, colliding with each other in high frequency.

As shown in FIGS. 2 and 3, in the device of heat production using the Lorentz force as a driving force of the electrolytic solution, it is desirable that the external magnetic field is strong as much as possible. In the present invention, the magnetic flux density of the external magnetic field is desirable to be more than 0.01 T (Tesla), more desirable to be more than 0.1 T, and the most desirable to be more than 0.5 T. Under 0.01 T, we can not always expect the sufficient mixing effect. We can use various magnetic fields which are not always uniform, but also non-uniform in position and time. Putting some ferromagnetic substances in a magnetic field, we can add non-uniformity to the external magnetic field, or make the magnetic field strengthened.

Figure 4:
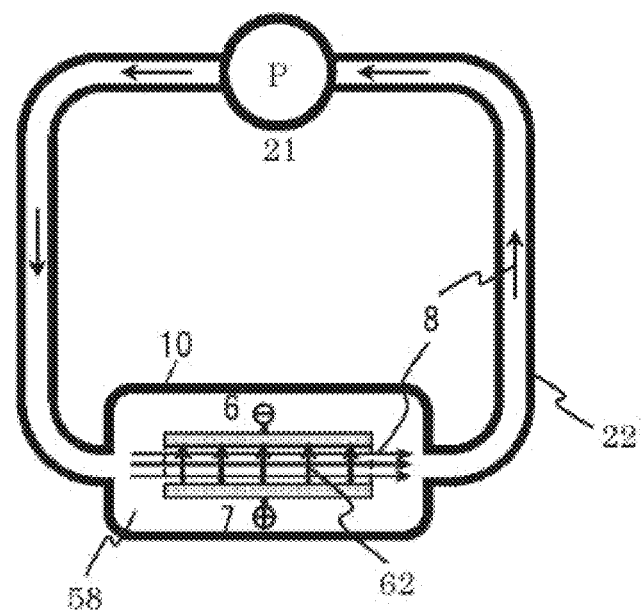
FIG. 4 The schematic of an example of the device by this invention, where an electrolytic solution is driven by a circulation pump.

FIG. 4 exhibits an example using the apparatus of mechanical circulation (circulation pump P) 21. The apparatus is provided by electrolysis cell 10 with two electrode 6 and 7. The electrolysis cell 10 concerned is equipped with two openings, and each opening is connected to the circulation pump 21 through channel 22. The insides of electrolysis cell 10 and channel 22 are filled with electrolytic solution 58.

The device in FIG. 4 performs the following processes: Electrochemical reactions are proceeded by the voltage applied or the current flowing between electrodes 6 and 7, so that ionic vacancies are created. At the same time, with circulation pump 21, we circulate (stream) electrolytic solution 58 within the apparatus (e.g., in the direction of arrow 8 in FIG. 4), so that the ionic vacancies created at the electrodes also move in the direction of arrow 8. Then, the vacancies are mixed with each other in the turbulence occurring in the neighborhood from the opening 10 of the electrolysis cell to the inlet of channel 22 of an electrolytic solution (the part of reducing diameter of channel: the means to enhance the collision frequency), producing heat by the collision and reaction of ionic vacancies with opposite signes.

Figure 5:
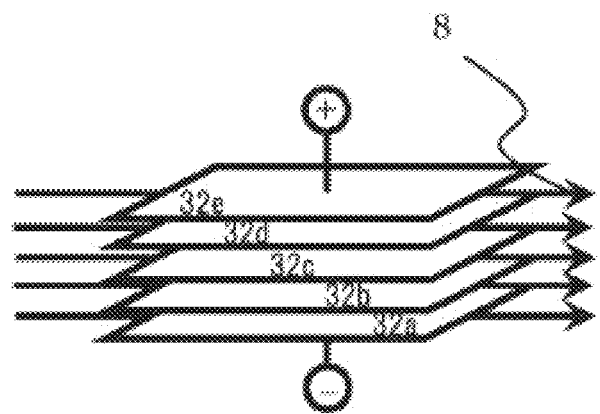
FIG. 5 The schematic of an example of the variation in electrode part, where multiple plane electrodes are used.

In FIG. 2 and FIG. 4, though the device provided by a pair of plane electrodes facing each other (anode and cathode) is exemplified, as shown in FIG. 5, layered multiple electrodes are also permitted. In the example of FIG. 5, by applying voltage between a pair of the most outer electrodes of the layered ones (32a and 32e), electrochemical reactions proceed between the electrodes adjoining via an electrolytic solution (e.g., between 32a and 32b, or 32b and 32c, etc.), producing a large amount of ionic vacancies. The ionic vacancies created at the electrodes move with the flowing electrolytic solution in the direction of arrow 8 in FIG. 5. By installing the means of making turbulence (e.g., mesh-type materials) in the neighborhood of the outlet of the electrodes, a large amount of ionic vacancies created collide and react, producing heat.

In the present invention, the corresponding electrochemical reactions are not specifically restricted by the kinds, i.e., electrode materials, compositions of electrolytic solutions and electrolysis potentials, etc. It is because as long as containing electron transfer, in any electrochemical reactions, ionic vacancies are created. Therefore, it is possible not always to introduce it to the devices using large-scale electrolysis cells (electrolysis vessels) such as in electrolysis refinement of copper and aluminum, etc., but also to apply it to heat-production devices of which systems are unified and miniaturized (e.g., portable heat-production device). In addition, the size and solvation energy of ionic vacancy tend to increase with the number of unit charge, so that from the viewpoint of increasing the collision frequency per a pair of ionic vacancy and the heat production by pair annihilation, it may be preferable that we choose electrochemical reactions creating ionic vacancies with large numbers of unit charges.

Figure 6:
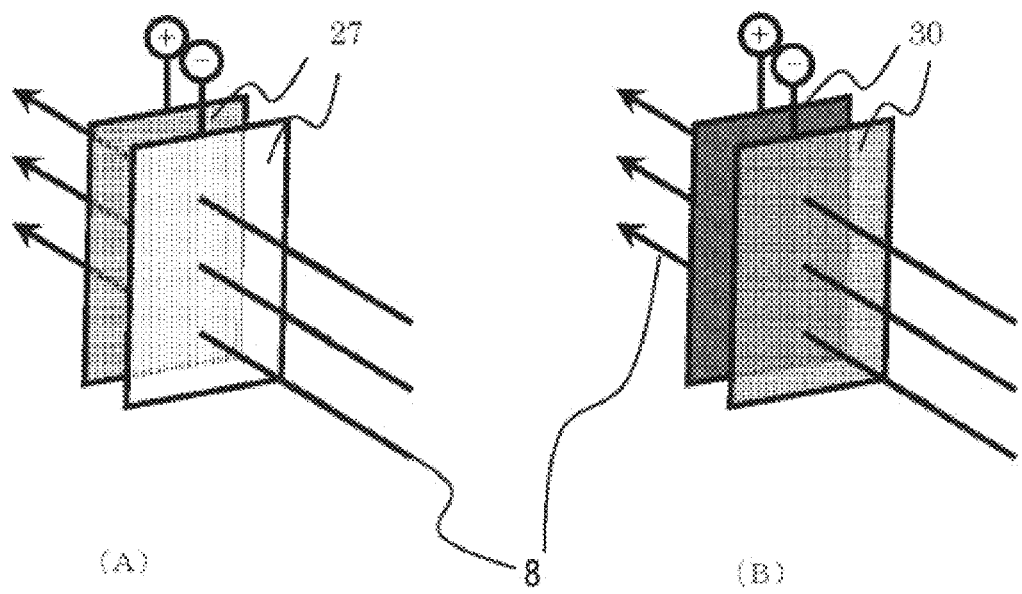
FIG. 6 The schematics of the examples of the variation in the electrode part, where (A) Mesh-type electrodes and (B) Sintered porous electrodes are used.

FIG. 6 represents other modified examples: FIG. 6 (A) is an example using metal-mesh-type electrodes 27 with grid space, and FIG. 6 (B) is an example using sintered porous electrodes 30. In the electrolysis cells equipped with these electrodes, when an electrolytic solution flows in the direction vertical to each electrode surface (in the direction of arrow 8 in FIG. 6), turbulence of the solution takes place by passing through the mesh and porous pores, so that the collision frequency of ionic vacancies created at the electrodes is promoted. Namely, in the examples shown in FIGS. 6 (A) and (B), the electrode structure serves both as a means of creating ionic vacancies and a means of enhancing collision frequency (the means of making turbulence). In these examples, it is also permitted to promote the efficiency of heat production by using the electrodes layered with more than one pair electrodes of mesh-type electrodes 27 and porous electrodes 30. Needless to say, we can make the shape of electrode not always plane, but also curved or cylindrical.

As to the products of electrochemical reactions in an electrolysis cell, we can suppose the following cases; one is the case where there is no product in solution except for precipitating impurity slime like in copper electrolysis refinement, and the other is the case where hydrogen and oxygen evolve as products like in water electrolysis. In the case where reaction products of gaseous matters evolve, we can settle a collection part of them.

On the other hand, in the case where reactants must be supplied to continue electrochemical reactions (the case where reactants are consumed by electrochemical reactions), to supply the reactants, we can install the reactant-supply part in the electrolysis cell.

Figure 7:
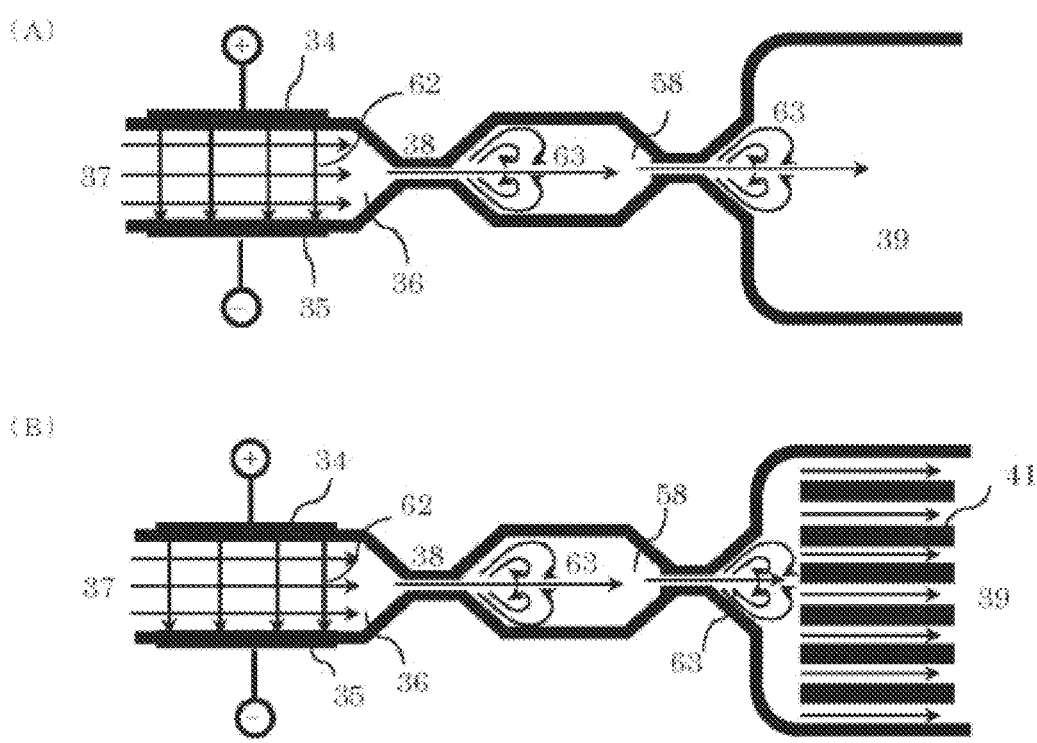
FIG. 7 The schematics of the examples of the variation in the device of the present invention. (A) The example equipped with the recovery means of heat composed of extended channels; (B) The example equipped with multiple parallel plates for the means of heat recovery.
Figure 8:
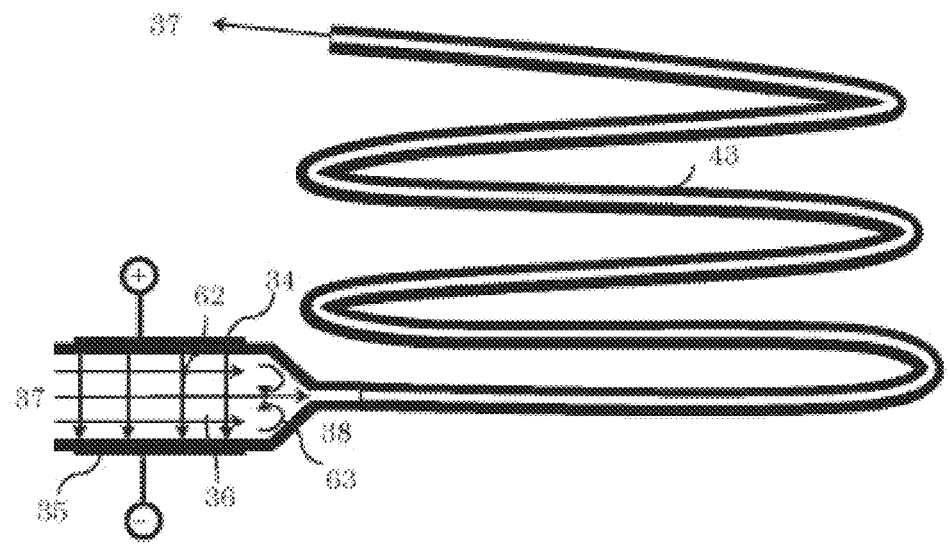
FIG. 8 The schematics of the examples of variation in the device by this invention. (A) The example equipped with meandering tubular means of heat recovery. (B) The example equipped with spiral means of heat recovery.
Figure 8:
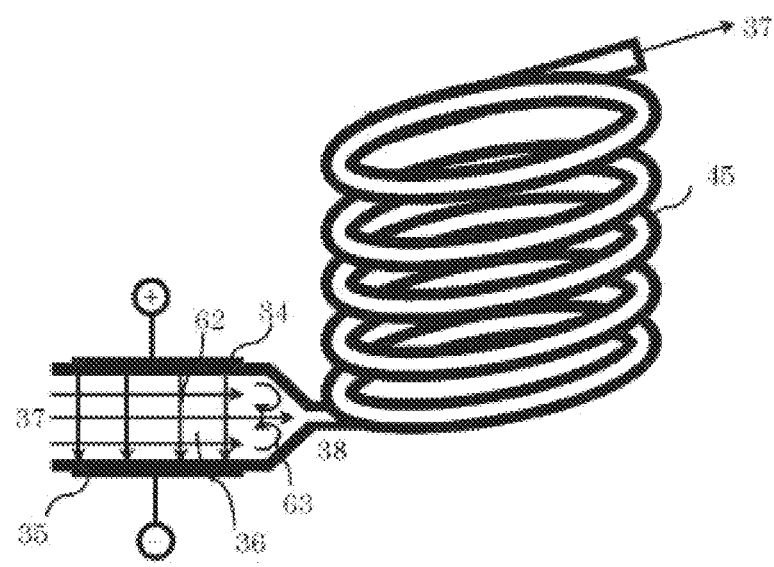

FIGS. 7 and 8 exemplify the devices provided with the means of heat recovery. In each example, electrochemical reactions proceed in the electrolysis cell with a pair of electrodes 34 and 35, and electrolytic solution flows in the right direction of the FIG.s (in the direction of arrow 37).

In FIG. 7 (A), the channel of an electrolytic solution is sharply narrowed at the outlet of the electrolysis cell (the narrowed part of channel) 38, then narrowed again after expanded, finally attaining more expanded channel 39. As shown in this example, by rapidly expanding and reducing the cross section of the channel, a turbulent flow occurs in the electrolytic solution, so that we can enhance the collision frequency, increasing the efficiency of the heat production.

Since the electrolytic solution containing the heat produced by the collision of ionic vacancies flows into the expanded part of channel 39, we can effectively take out the heat for use from the expanded part 39 made of the materials with high thermal conductivity. Namely, the expanded part 39 plays a role of heat recovery means (heat exchanger).

FIG. 7 (B) is an example that in the expanded part of channel 39 shown in FIG. 7(A), multiple plates of high thermal conductivity are arranged parallel to the channel at optional intervals. Since when the solution passes through the plates, the heat created transfers from the solution to the plates, we can make the heat exchange more effective.

FIG. 8 is the modified examples for the expanded part of channel 39 in FIG. 7. i.e., one example where the tubular channel of an electrolytic solution is bent (meandering) (FIG. 8 (A)) and the other example where it is spiraled (FIG. 8 (B)). In all cases, it is shown that by making the tubular channels of the heat recovery means in optional shapes, in keeping the whole size small, the device can be adapted for various uses.

Figure 9:
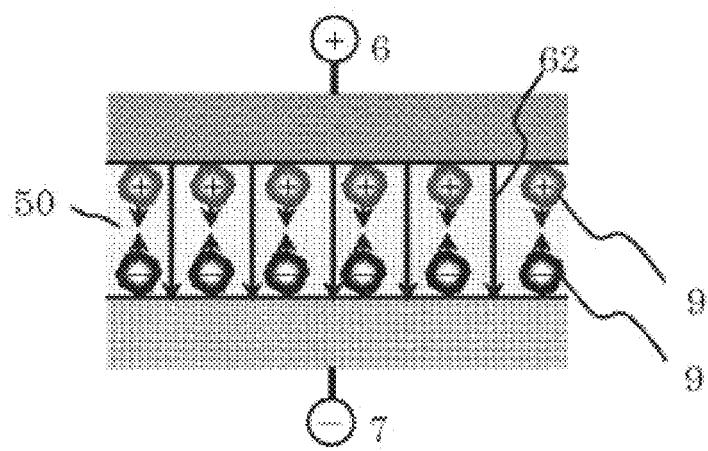
FIG. 9 The schematic of an example of variation (narrowing the interval of electrodes).
Figure 10:
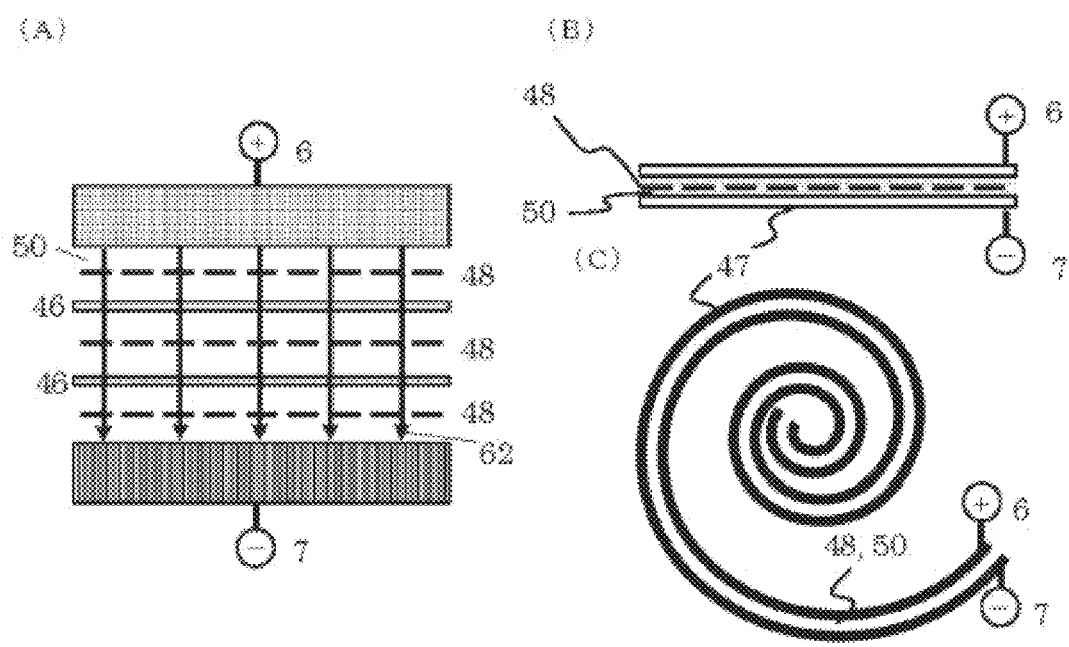
FIG. 10 The schematics of the examples of the variation in the device shown in FIG. 9. (A) The example of layered electrodes; (B) The example of flexible electrodes; (C) The example of rolled flexible electrodes.
Figure 11:
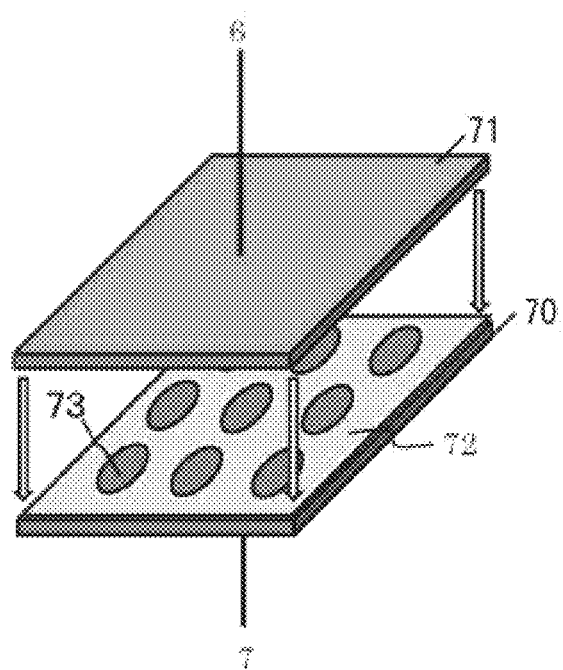
FIG. 11 The schematic of an example of the device of the heat production by this invention, which is fabricated by the microprocessing using photo-lithography.

FIG. 9 to FIG. 11 exemplify some devices using the narrowness of the interval of electrodes as the means for enhancing the collision frequency of ionic vacancies.

Ionic vacancies created on an electrode surface form a layer of ionic vacancies of order of 1 μm thickness in the electrolytic solution close to the electrode. Therefore, if the interval between cathode and anode can be approached to the same order of distance as the thickness of ionic vacancy layer concerned, we can enhance the collision frequency of ionic vacancies without using the means of an electrolytic solution flow mentioned above. Although it is preferable that we brings one electrode close to another as near as possible without a short circuit, it is preferable that we takes the sum of the thicknesses of plus and minus ionic vacancy layers (about 2 μm order) as the lower limit. The upper limit of the electrode interval is permitted as long as the plus ionic vacancy and minus ionic vacancy collide with each other even if the electrolytic solution does not flow. For example, it is desired to design it below 10 mm, preferable below 1 mm, and more preferable below 0.1 mm.

In the example shown in FIG. 9, the interval between cathode and anode is taken less than 0.1 mm (e.g., 50 nm). As a result, proceeding electrode reactions by applying potential to a pair of plane electrodes 6 and 7, due to molecular motions, we can make ionic vacancies 9 created near one of the electrodes collide and react with ionic vacancies with opposite charges created near the other electrode, so that we obtain the heat production. For this type of device, it is possible to unify and miniaturize the whole device, for example, by using paste-like or solid-like electrolyte 50 as an electrolytic solution in electrolysis cell. To protect a short circuit, it is also permitted that a spacer (porous) is inserted between electrodes (plane electron conductors).

FIG. 10 represents some modified examples of the device of heat production shown in FIG. 9. FIG. 10 (A) is an example where plural plane electron conductors 46 are inserted between a pair of electrodes. FIG. 10 (B) shows a pair of flexible electrodes 47 faced each other at an interval of less than 0.1 mm through an electrolytic solution 50 and a porous space 48. This electrode can be also provided as an electrolysis condenser-type of scroll rolling up the electrodes themselves (FIG. 10 (C)). Moreover, we can also jointly use electrodes with minute unevenness such as meso-pores (pores with diameters of 2 nm to 50 nm).

FIG. 11 exhibits a schematic of an example of the device of heat production by this invention produced by the microfabrication technology using photo-lithography.

For example, after making an insulator film (e.g., silicon nitride film) 72 on an electrode 70 with a metallic thin film formed on a silicon substrate surface, removing a part of the silicon nitride film mentioned above by using photo-lithography, we prepare openings 73. On the other handle, electrode 71 facing the openings is provided by a metallic thin film formed on the surface of silicon substrate (the lower surface in FIG. 11).

Filling up a liquid-type, paste-type or solid-type electrolyte in openings 73 mentioned above, and layering two electrodes 70 and 71, we can produce the device of heat production by this invention.

EXAMPLES

The present invention will be explained in more detail using the following examples. However, the invention is not limited by them.

Example 1

Figure 12:
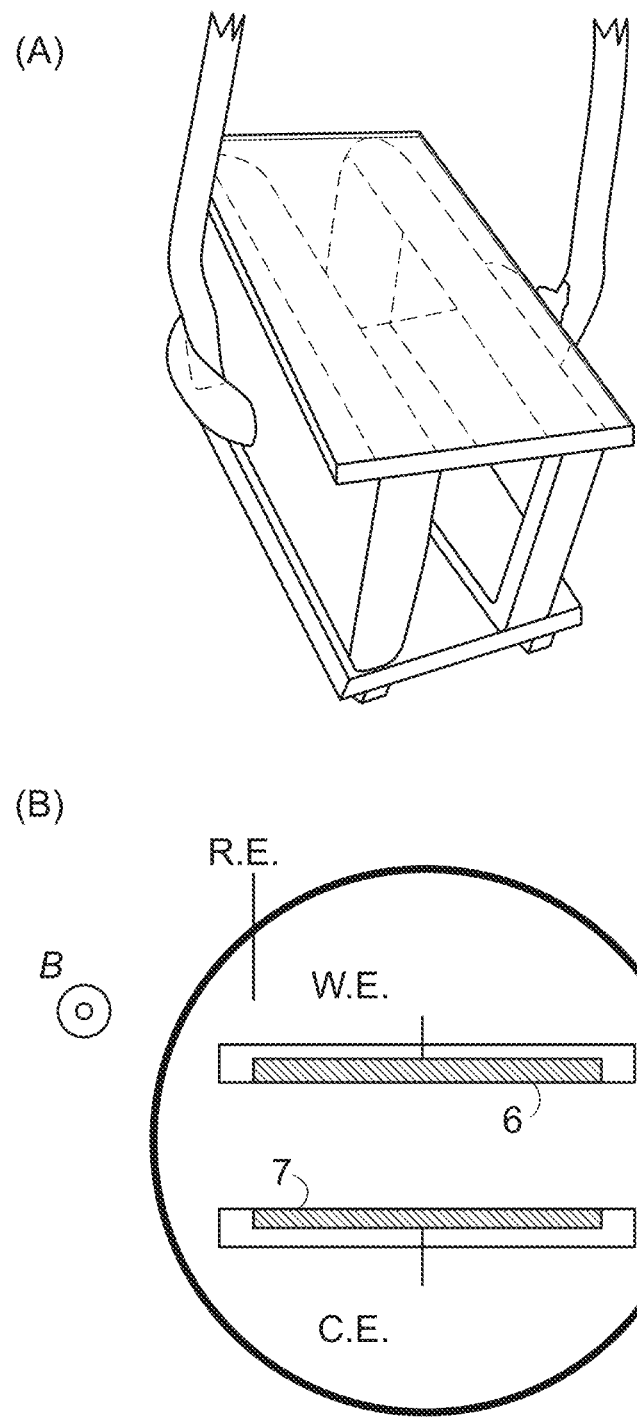
FIG. 12 The photo of the electrolysis cell used in Example 1, which was produced experimentally (A), and the schematic cross section showing the structure of it (B).

FIG. 12 (A) is the photo of the electrolysis cell of the heat production device experimentally produced as an Example of this invention, and (B) is the cross section of the schematic structure of the device experimentally produced. The electrolysis cell of this Example (FIG. 12 (A)) was composed of a pair of plane electrodes faced each other in an interval of 5 mm (in the FIG., they are indicated by W. E. and C. E.; copper plane electrodes of a 10 mm height, a 20 mm width and a 1 mm thickness, which was embedded in a transparent acrylic acid resin plate with a 22 mm width.) and the rectangular space surrounded by the electrodes and the surfaces of the walls of acrylic plates (10 mm high, 5 mm wide and 22 mm long), which were glued at the upper and lower sides of the electrodes. The electrolysis cell concerned was put in a cylindrical vessel made of acrylic acid resin with a 25 cm inside diameter, which was filled with an electrolytic solution. The lead connected to each electrode was extended out of the vessel, and able to be connected with a power source (not illustrated). In addition, a reference electrode to measure the electrode potential (shown by R.E. in the FIG.) was contacted with the electrolytic solution.

The electrolytic solution used in this Example was a mixed solution of sulfuric acid (0.5 mol/dm$^3$) and copper sulfate (0.3 mol/dm$^3$). This Example was performed by a parallel-plane-type MHD electrode, which drove the flow of an electrolytic solution by the electromagnetic force (Lorentz force) arising from an electrochemical reaction under an external magnetic field B. Streaming of the electrolytic solution by Lorentz force promoted the collisions of plus and minus ionic vacancies.

Figure 13:
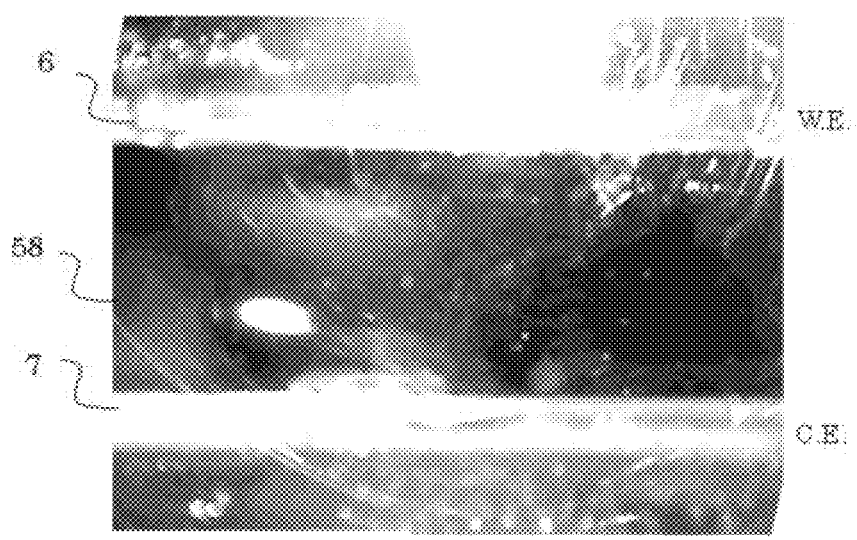
FIG. 13 The photos of the interior of the electrolysis cell used in Example 1. (A) Before electrolysis, (B) During electrolysis.
Figure 13:
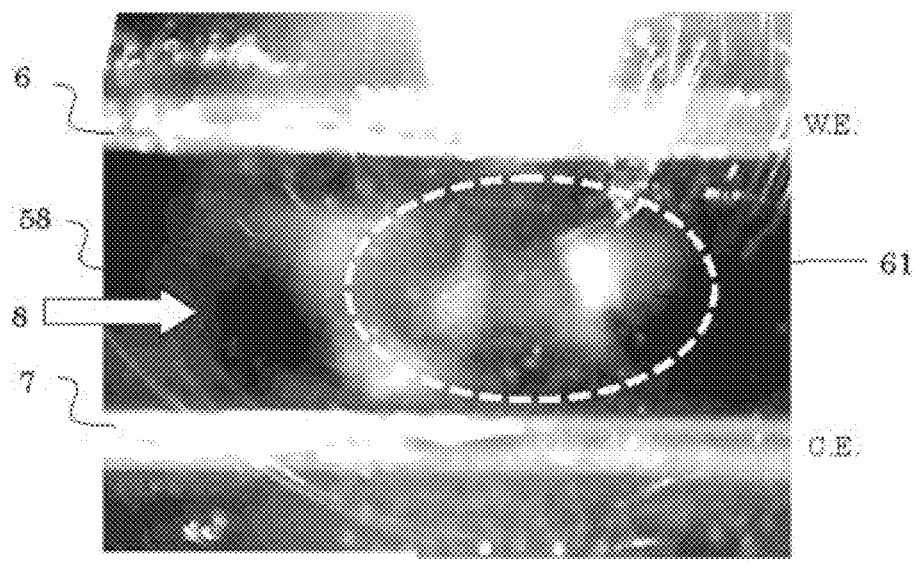

FIG. 13 represents the photos of the inside of the electrolysis cell before (A) and when (B) flowing an electrolysis current (0.24 A) under an external magnetic field of 10 T. In FIG. 13 (B), it was ascertained that microbubbles occur in the solution moving with a velocity of ca. 10 cm/s in a direction vertical to the magnetic field and the electrolytic current (in the direction of the arrow in FIG. 13). Since both of the working electrode (used as a cathode) (W. E.) and the counter electrode (used as an anode) (C. E.) did not attain the hydrogen- and oxygen-evolution potentials, respectively, it was concluded that the observed microbubbles are originated from ionic vacancies.

Figure 14:
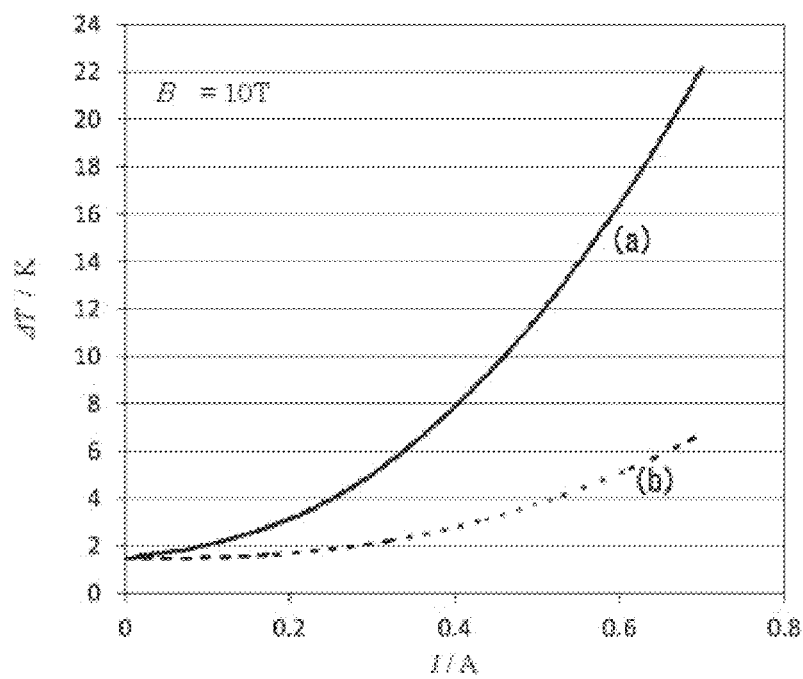
FIG. 14 The graph of the temperature change against electrolytic current at an external magnetic field of 10 T, which was performed by the experimentally produced apparatus in Example 1, (a) Solid line shows the temperature change (K) of the electrolytic solution, (b) Break line shows the temperature change by Joule's heat.

FIG. 14 shows a graph of the relationship between the current (A) and the temperature change of electrolytic solution (K), when the increasing electrolytic current from zero in a sweeping rate of 0.2 mA/s under an applied external magnetic field of 10 T (a solid line). The temperature change obtained was compensated by the heat escaping from the vessel. For comparison, the temperature change by Joule's heat is also expressed by a break line, which was calculated from the data of the current and the measured voltage.

In the electrochemical reaction of this Example, since copper dissolution takes place at an anode and copper deposition occurs at a cathode, the reaction heat arising from the reactions is zero. The electrodes and the outside of the electrolysis cell are connected only by leads, so that heat loss of the connection is neglected. Namely, except for the collision of ionic vacancies, the heat generated in the electrolysis cell is only Joule's heat arising from the electrolysis current.

Figure 15:
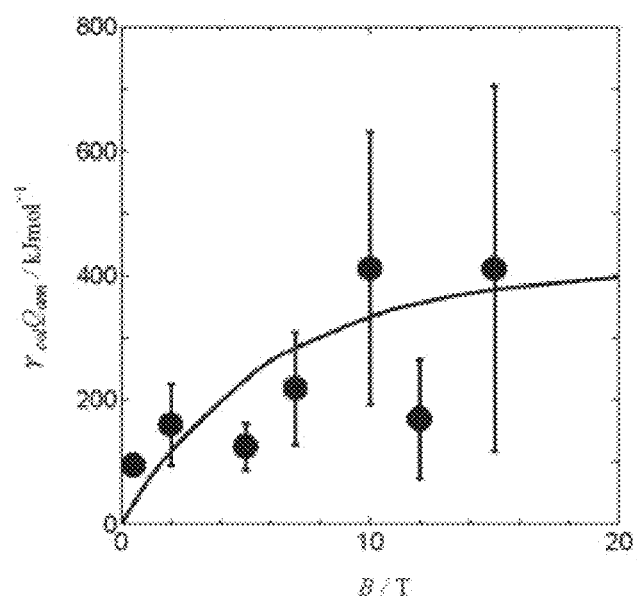
FIG. 15 The graph of the produced heat against magnetic flux density in Example 1.

Then, in FIG. 15, after doing the similar measurement under various magnetic flux densities of the external magnetic field, we plotted the heat amount (heat amount generated by the collision of ionic vacancies) obtained by subtracting the heat amount corresponding to the temperature change by Joule's heat from the total heat amount corresponding to the temperature change of electrolytic solution, which was measured in each magnetic flux density. The horizontal axis is the magnetic flux density of the applied magnetic field (T, Tesla), and the vertical axis is the heat amount obtained from the reaction per each one molar ionic vacancy in this device of heat production (kJ/mol).

As shown in FIG. 14, due to the heat production from the collision of ionic vacancies, the heat experimentally measured greatly surpassed the Joule's heat arising from the same current.

In addition, the heat amount was determined by using the following cubic equation (4). Namely, applying the value measured by a thermometer attached to the side wall of the electrode and the value of the electrolysis current to the equation (4) describing the temperature difference ΔT between the outside world and the electrolytic solution, we first obtained the coefficients $A_0$, $A_1$ and $A_3$, and then determined the heat amount.

$$\Delta T = A_0 + A_1 I^2 + A_3 I^3 \tag{4}$$

It has been already proved that the heat amount obtained by this way exactly describes the heat amount based on the collision of ionic vacancies.

In FIG. 15, since in the absence of solution flow under zero magnetic flux density, the collisions of ionic vacancies do not occur, the heat amount becomes zero at zero magnetic flux density, whereas in the case of the increasing solution flow with magnetic flux density, the heat amount also increases, approaching a plateau with largely scattering data. As shown in FIG. 13, with increasing magnetic flux density, the creation of nanobubbles from the collisions of ionic vacancies with the same signs and the further creation of microbubbles from nanobubbles were activated, so that the collisions between ionic vacancies with opposite signs were blocked by them. As a result, it was thought that together with reaching an upper limit, the measurements are largely scattered.

However, as shown in FIG. 15, the average heat obtained at 15 T by the device of this Example was ca. 420 kJ/mol, which is 1.5 times larger than the combustion heat of hydrogen (285.84 kJ/mol). As the largest value obtained, the heat reaching 800 kJ/mol was also observed, which is about three times larger than the combustion heat of hydrogen.

Since the energy of matter activated by magnetic field is, even at 10 T, of order of magnitude of several J/mol, such a magnetic field energy does not directly contribute to the heat observed in this Example. It is therefore obvious that the heat amount observed in this Example depends on the collision efficiency of ionic vacancies with opposite signs.

Example 2

Figure 16:
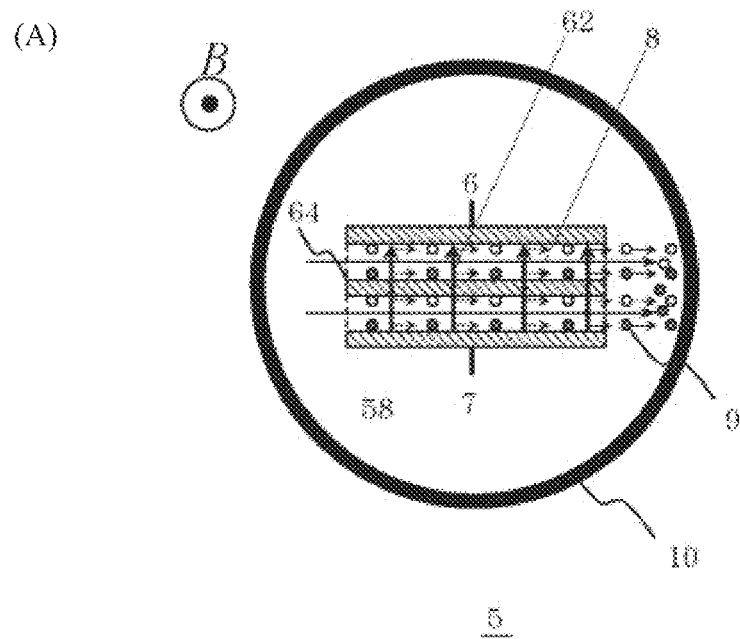
FIG. 16 The schematic of the rough sketch of the experimentally produced apparatus with three-layered electrodes used in Example 2.
Figure 16:
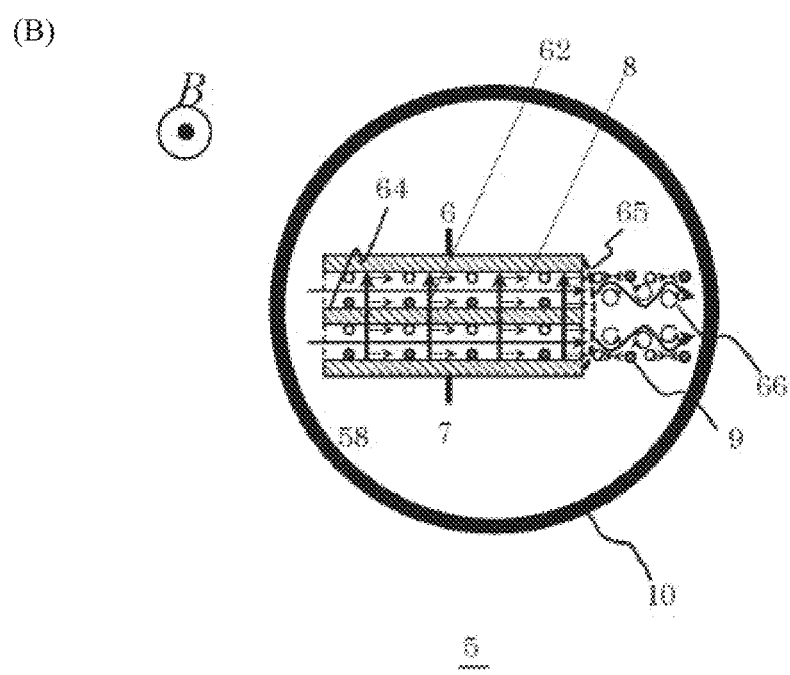
Figure 17:
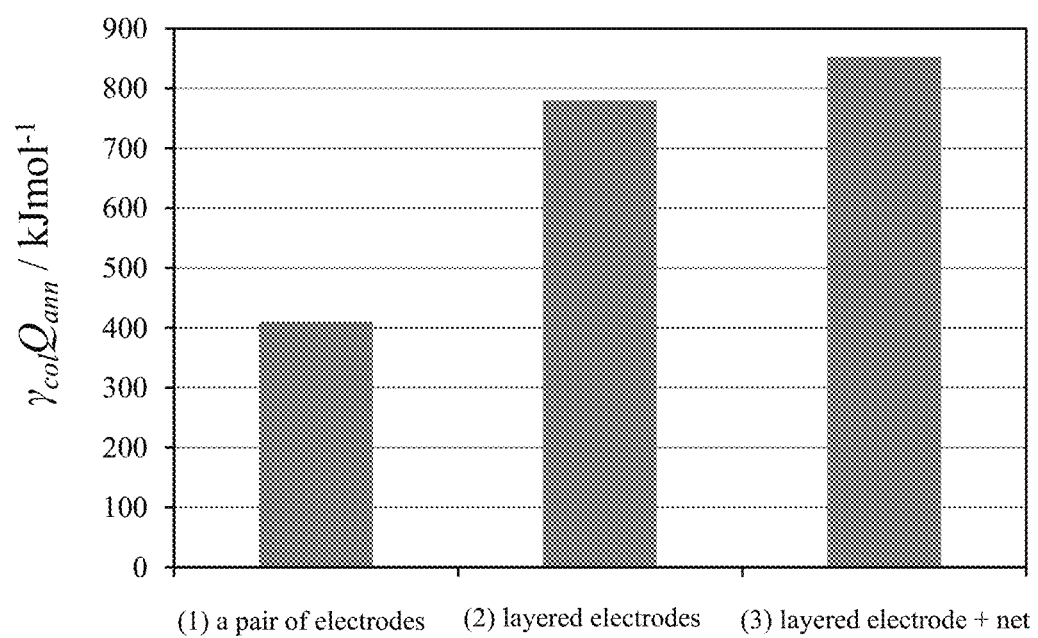
FIG. 17 The graph of the relationship between the produced excess heat and the electrode structure measured in Example 2.

We compared the following two heat amounts (heat produced by the collision of ionic vacancies) obtained by different types of electrodes; one was the case using a pair of (two) electrodes shown in the enforced example 1 mentioned above (FIG. 12), and the other was the case using three-layered electrodes shown in FIG. 16. The experimental conditions (electrode shapes, materials, electrolysis conditions, etc.) and the measurement method were the same as the Example 1. In addition, the heat amounts obtained at 10 T in the experiments were averaged, represented in the graph of FIG. 17.

Since in the case using a three-layered electrode (FIG. 16 (A)), the electrode areas are twice as much as those of a pair of electrodes, it is theoretically thought that the expected heat amount would be twice larger than that of two electrodes (a pair electrodes) shown in FIG. 12. However, the heat amount actually measured did not reach the twice value of the heat production by a pair of electrodes (ca. 420 kJ/mol) (compared between (1) a pair of electrodes and (2) layered electrodes in FIG. 17). However, we performed again the measurement after installing mesh materials (net with 3 mm openings and 0.2 mm diameter fibers) at the outlet of the electrolytic solution of the layered electrode (FIG. 16 (B)), so that we obtained the heat amount twice as much as that of a pair of electrodes ((3) layered electrode+net in FIG. 17). Namely, by using the means to enhance the collision efficiency (mesh materials), due to the occurrence of a turbulent flow (Kármán vortex), we could make the collision efficiency increased, and the heat production efficiency also promoted.

INDUSTRIAL APPLICABILITIES

The present invention is composed of the methods of heat production and the devices of heat production, which first utilize ionic vacancies in electrolytic solutions never utilized before. The methods and devices of the invention are easily applicable to the industries using electrochemical reactions operating as before, and we can obtain inexpensive and effective heat production. Furthermore, by miniaturize the devices of this invention, we can provide small-sized devices of heat production, which are applicable to portable or other various uses.

EXPLANATION OF SYMBOLS

1, Schematic diagram of a minus ionic vacancy; 2, Free-space portion of ionic vacancy (free-space core); 3, Outer shell with the charges of ionic vacancy; 4, Ionic cloud with opposite charges; 5, Device of heat production; 6 and 7, Plane electrode; 8, Flow direction; 9, Ionic vacancy; 10, Electrolysis cell (vessel); 14 and 15, Cylindrical electrode; 21, Apparatus of mechanical circulation (circulation pump); 22, Channel of electrolytic solution; 27, Mesh electrode; 30, Sintered or porous electrode; 32a to 32e, Electrode; 34 and 35, Electrode; 36, Electrolysis cell; 37, Flow direction; 38, Reduced part of channel; 39, Expanded part of channel; 41, Layered parallel plates; 43, Meandering channel; 45, Spiral channel; 46, Plane electron conductor; 47, Flexible electrode; 48, Spacer for the prevention of the short circuit of electrodes; 50, Electrolyte; 58, Electrolytic solution; 61, Microbubble; 62, Current; 63, Turbulent flow; 64, Middle plane electrode; 65, Mesh materials (net), 66, Kármán vortex, 70 and 71, Electrode; 72, Insulator film; 73, Opening.

The invention claimed is:

1. A device of heat production comprising:
an electrolysis cell with an anode and a cathode and an electrolytic solution accommodated in said electrolysis cell,
   wherein, collision of ionic vacancies with different signs created through said anode and said cathode by proceeding an electrochemical reaction within said electrolysis cell produces heat, and a heat recovery means configured to recover heat arising from the collisions of ionic vacancies within the electrolysis cell,
   wherein said device further comprises a means to enhance the collision frequency of said ionic vacancies with different signs consisting of narrowing an interval between said anodes and said cathode, and
   wherein said electrolytic solution comprises paste electrolytes or solid state electrolytes.

2. The device of heat production according to claim 1, wherein said interval between said anode and said cathode is not more than 0.1 mm.

3. The device of heat production according to claim 2, wherein said electrolytic solution comprises paste electrolytes.

4. The device of heat production according to claim 2, wherein said electrolytic solutions comprises solid state electrolytes.

5. The device of heat production according to claim 1, wherein said electrolytic solution comprises paste electrolytes.

6. The device of heat production according to claim 1, wherein said electrolytic solutions comprises solid state electrolytes.

* * * * *

UNITED STATES PATENT AND TRADEMARK OFFICE
CERTIFICATE OF CORRECTION

| | |
|---|---|
| PATENT NO. | : 11,692,741 B2 |
| APPLICATION NO. | : 17/264078 |
| DATED | : July 4, 2023 |
| INVENTOR(S) | : Ryoichi Aogaki et al. |

It is certified that error appears in the above-identified patent and that said Letters Patent is hereby corrected as shown below:

In the Specification

In Column 2, Line 30, delete "al." and insert -- al, --.

In Column 2, Line 34, delete "al." and insert -- al, --.

In Column 3, Line 60, delete "1," and insert -- 1. --.

In Column 4, Line 12, delete "cloude" and insert -- cloud --.

In Column 4, Line 19, delete "nimus" and insert -- minus --.

In Column 4, Line 31, delete "existance" and insert -- existence --.

In Column 5, Line 14, delete "amount:" and insert -- amount; --.

In Column 6, Line 63, delete "cathods" and insert -- cathodes --.

In Column 7, Line 20, delete "disturbed" and insert -- disturb --.

In Column 8, Line 56, delete "signes." and insert -- signs. --.

In Column 9, Line 59, delete "FIG.s" and insert -- FIGS. --.

In Column 10, Line 14, delete "7." and insert -- 7, --.

Signed and Sealed this
Seventh Day of November, 2023

*Katherine Kelly Vidal*

Katherine Kelly Vidal
*Director of the United States Patent and Trademark Office*